Sept. 13, 1932.  E. S. BUCK  1,877,223
METHOD OF HUMIDIFYING AIR
Original Filed Feb. 27, 1929  3 Sheets-Sheet 1
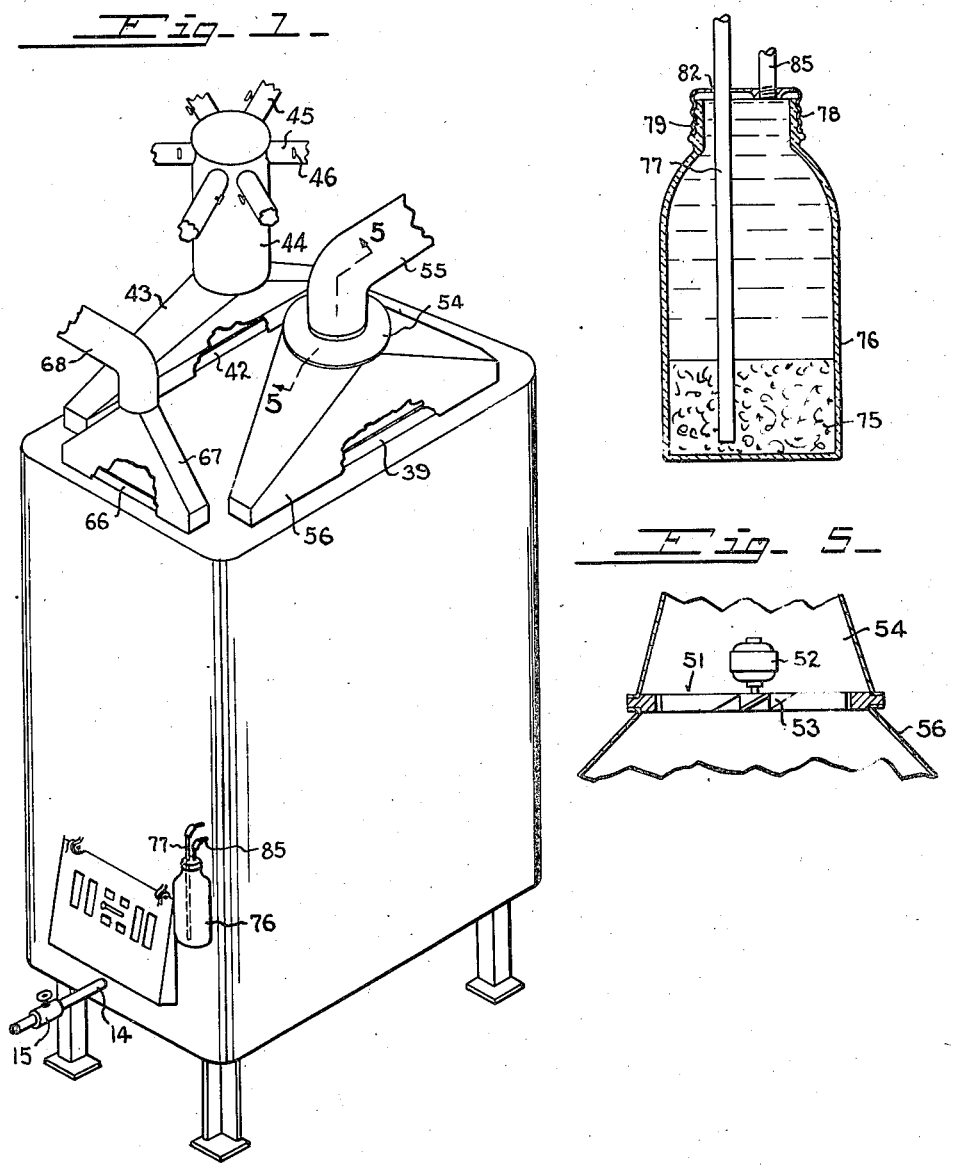
INVENTOR:
Everett S. Buck
BY
ATTORNEY.

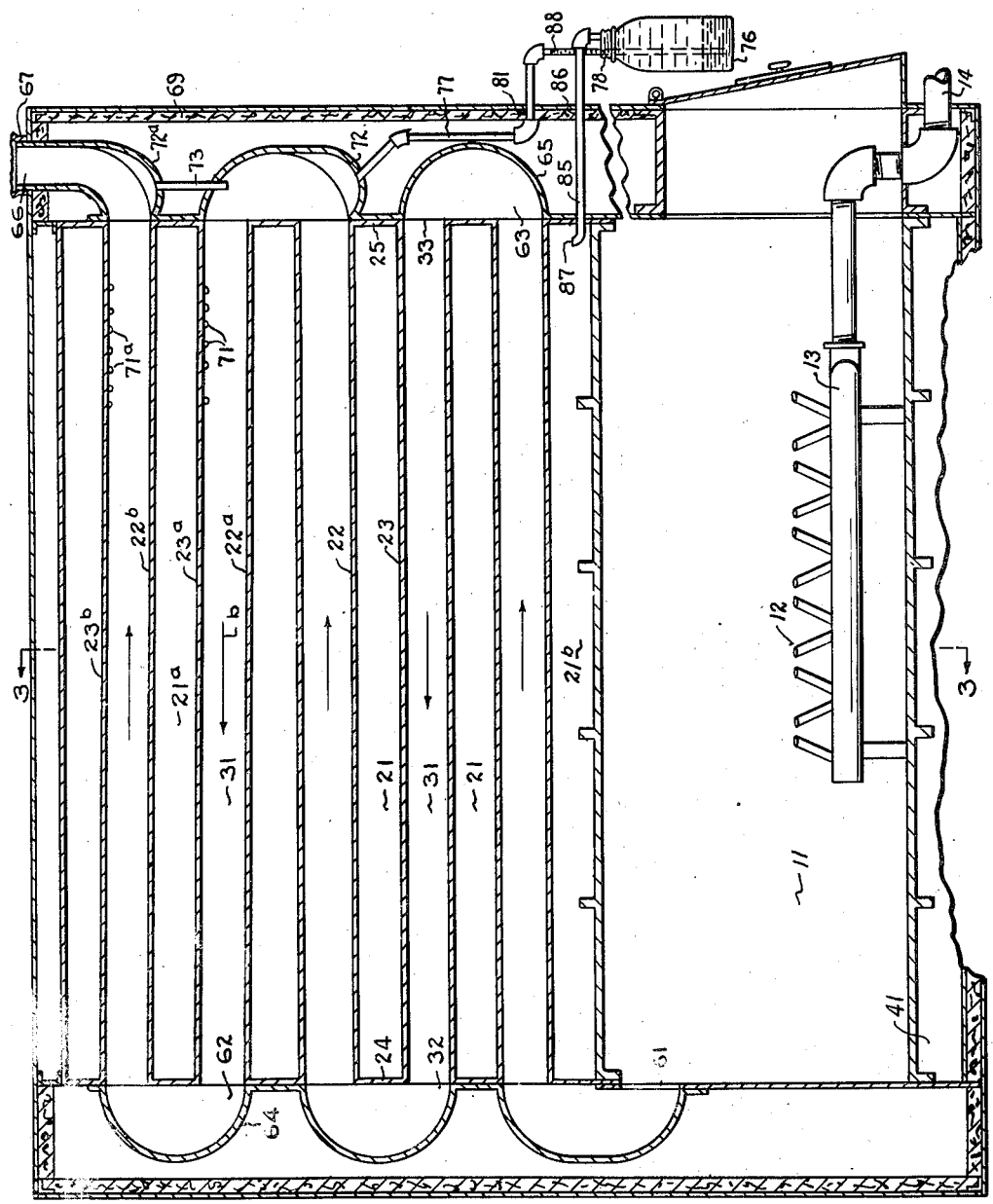

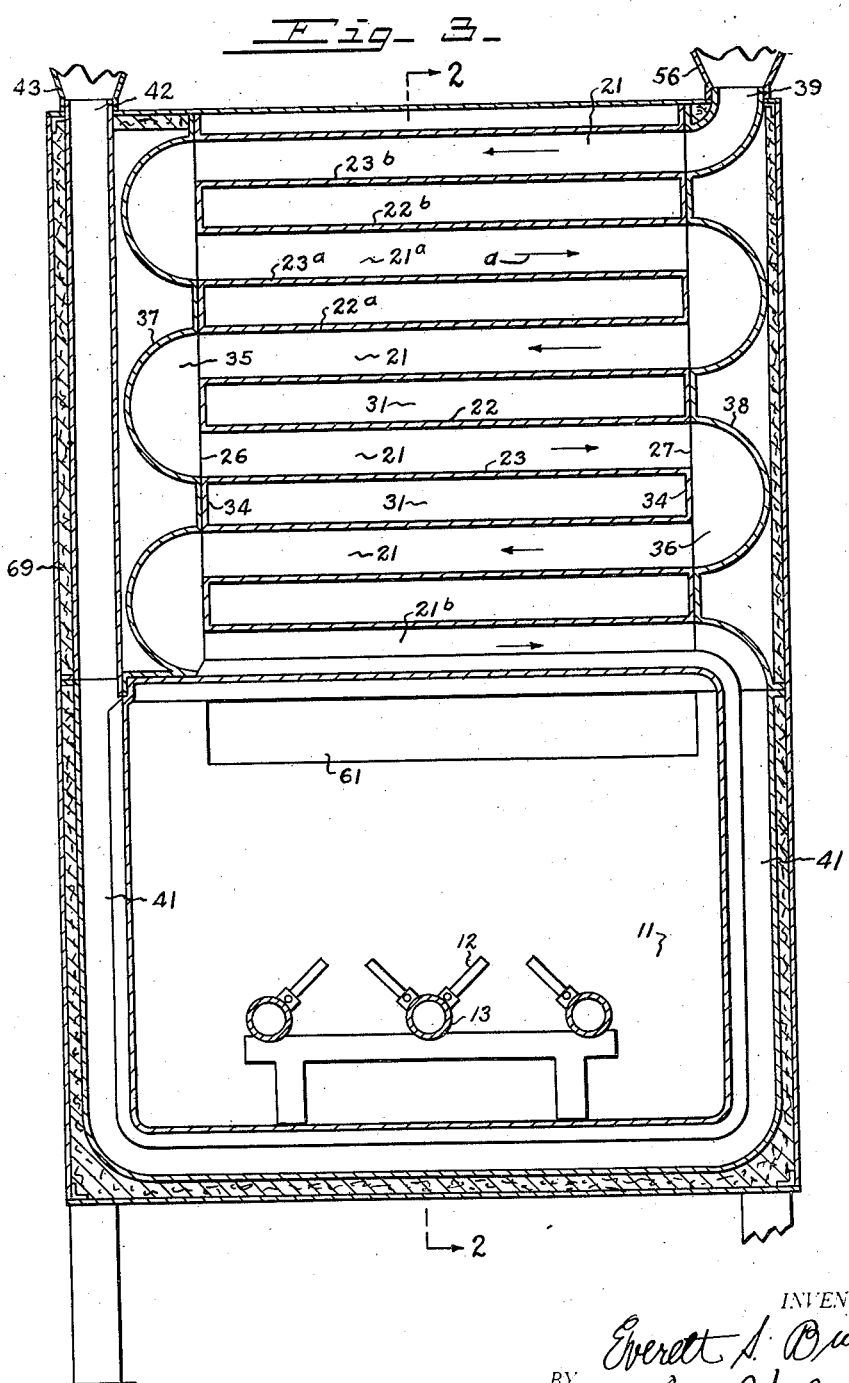

Patented Sept. 13, 1932

1,877,223

UNITED STATES PATENT OFFICE

EVERETT S. BUCK, OF CINCINNATI, OHIO, ASSIGNOR, BY MESNE ASSIGNMENTS, TO THE EDWARDS MANUFACTURING COMPANY, OF CINCINNATI, OHIO, A CORPORATION OF OHIO

METHOD OF HUMIDIFYING AIR

Original application filed February 27, 1929, Serial No. 343,047. Divided and this application filed April 30, 1930. Serial No. 448,615.

It is the object of my invention to humidify air by introducing thereinto condensation of the flue vapor arising from the heating fuel used in heating the air; and, further, to purify said condensation so that the purified condensation is used for this purpose; further, to employ condensate vapor of the products of combustion, from which impurities, such as acids or alkalies, or physical impurities, have been removed or neutralized, as a humidifying agent for humidifying the air used for heating a room, chamber or other enclosure; and, further, to automatically control the amount of humidification in the heated air by the amount or intensity of the heat supplied in heating the air.

It has been the experience in heating plants employing heated air as a heating medium that it is advisable to supply the air with moisture, as otherwise the heated air proceeding from the heating plant is too dry for human comfort or for other living creatures, as well as for articles, such as furniture, in the enclosure for human habitation or use. It has been usual heretofore to supply moisture by evaporation from water supplied extraneously of the heating plant, as from a hydrant or other source of moisture.

It has been the experience in heating by means of a combustible fuel, such as gas, or hydrocarbon fuel, that condensate forms in the flue vapors, and that moisture is precipitated from the flue vapors, which condensate or preciptated moisture has heretofore been an objectionable feature in such heating, it having been necessary heretofore to provide means for disposing of the same as a waste product, as by piping the same to a waste system or sewer.

In my invention I gainfully use this condensate or precipitated moisture as a humidifying agent, transferring the same, as the same arises, to the passage for the air being heated.

I further employ such condensate or precipitated moisture as a proportional humidifying agent in such passage for the air being heated, my invention providing for supplying such condensate or precipitated moisture in varying quantity varying according to the amount of combustion and the temperature of the air being heated, and consequent variations in the amount of heat supplied; and, further, my invention provides a balanced humidification proportional to the amount of combustion and heat supplied.

In my invention I employ vapor in the passage or flue for the products of combustion used in heating the air, cause condensation of such vapor, preferably purify this condensation or neutralize the deleterious or other acids or alkalies therein, and use the preferably purified condensation for humidifying the air heated by said products of combustion.

In employing my invention, the amount of condensation is preferably regulated by the amount or temperature of the products of combustion passing through the combustion passage or flue, so that the amount of condensation in substantially proportional to the amount of heat supplied for heating the air, and the amount of air heated or the degree of temperature to which the air is heated is proportional to the amount or temperature of the products of combustion.

The greater the amount of air being heated, or the degree of temperature to which the air is heated, passing through the heating plant, the greater the amount of condensation or condensed vapors which is required to properly humidify the heating air. In my invention, further, the amount of condensation obtained from the products of combustion and supplied to the heating air is substantially proportional to the amount or heat of the products of combustion and the corresponding amount or degree of temperature of the heating air.

Thus a small amount of condensation is supplied to the heating air when only a small amount of heat is being supplied, for instance in temperate weather, when a small amount of humidification in the heated air is required, and a proportional larger amount of condensation is supplied to the heating air as the amount or heat of the heating air is increased, for instance in colder weather, when a greater amount of humidification in the heated air is required.

The invention will be further readily understood from the following description and claims, and from the drawings which illustrate a furnace for heating air employing my improved method, although the structure or arrangement of the furnace or heating plant is immaterial within the scope of my present invention. I make no claim herein to the means for producing and utilizing the humidification herein shown and described, having shown, described and claimed the same in a copending application for patent on improvements in means for humidifying air for heating and other purposes, Serial No. 343,047, filed February 27, 1929, of which this application is a division, and issued as Patent No. 1,778,447, dated January 13, 1931, and to which reference is here made.

In the drawings:

Fig. 1 is a perspective view of an exemplifying heating plant, partly broken away.

Fig. 2 is a vertical longitudinal section of the same, taken in the plane of the line 2—2 of Fig. 3, and partly broken away.

Fig. 3 is a vertical cross-section of the same, taken in the plane of the line 3—3 of Fig. 2, and partly broken away.

Fig. 4 is a detail view of the purifying means, showing an axial section of the same; and, Fig. 5 is a sectional detail view showing the blower, taken on the line 5—5 of Fig. 1.

The heating plant may be a furnace, combined boiler and economizer, or other device for heating air. The heating plant is exemplified as a furnace comprising a fire-box 11, in which the heat is generated, as for instance by means of gas burners 12 of suitable construction attached to a manifold 13, with which a feed-pipe 14 connects, a control valve 15 being in the feed-pipe.

Passages 21 are shown rectangular in cross-section provided with upper walls 22, lower walls 23, and side walls 24, 25. These passages are open-ended as shown at 26, 27. These passages are arranged one above the other in the heater, and are spaced apart by spaces 31, which form passages crossingly arranged with relation to the passages 21. The passages 31 are open-ended as shown at 32, 33, and have side walls 34.

Connecting passages 35, 36, formed by deflectors 37, 38, having closed ends, connect neighboring passages 21, such neighboring passages being one above the other at the respective ends of said passages.

There is an inlet-port 39 communicating with the upper passage 21. The lower passage 21$^b$ connects with an extension passage 41, which extends downwardly at one side of the fire-box, crosswise under the fire-box, and upwardly at the other side of the fire-box and of said cross-passages, and at its upper end has an outlet-port 42 which connects with a hood 43, which directs the heated air into a drum 44, from which suitable heating pipes, shown at 45, provided with usual dampers 46, direct the heated air to the desired points of use, as to the various rooms in a dwelling or to other spaces to be heated. The hood and parts thereabove may if desired be omitted.

The passages 21 extend throughout the major portion of the width of the heater and, with the connecting passages 35, 36, formed by the deflectors, form a serpentine passage for the air to be heated. The direction of movement of the air in said passage is indicated by the arrows $a$. The air is received through the inlet-port 39 and is exemplified as having a general downward course in said passage above the fire-box. It is forced around the bottom of the fire-box and then ascends in the ascending stretch or extension of the passage, and is received through the discharge-port 42 of said passage.

The air to be heated is preferably forced in a direction reverse to the direction of natural flow of heated air, which would be upward in the serpentine passage. The air to be heated is forced downward, as by means of a blower 51, which comprises an electric motor 52 and a fan 53 in an intake chamber 54, to which a pipe 55 may lead from a suitable source. A hood 56 is located between the blower and the inlet-port 39, and directs the air into the air passage of the heater.

The products of combustion are received through an opening 61 in the rear wall of the fire-box or combustion chamber. The respective upper walls and lower walls of the passages 21 above the fire-box form respectively the lower wall and the upper wall of the passages 31, crossingly arranged with relation to the first-named passages. The ends of neighboring passages 31 above one another are connected at the respective ends of said passages by means of connecting passages 62, 63, formed by deflectors 64, 65, having closed ends. The passage for the products of combustion is provided with an outlet port 66, connecting with a hood 67, from which a smoke-stack or flue 68 extends. The lower one of said deflectors connects the lower passage 31 with the opening 61 in the fire-box.

A serpentine passage extending back and forth is thus provided for the products of combustion, the course of the products of combustion being indicated by the arrows $b$. The products of combustion have a serpentine passage back and forth between the passages through which the air being heated moves back and forth in a serpentine path. The products of combustion are separated from the heated air by a single thickness of sheet metal which forms a dividing wall between the passages through which the products of combustion and the air respectively pass, providing for extreme transference of heat to said air.

The outer walls of the furnace may be provided with suitable insulation exemplified at 69.

In the present exemplification, the products of combustion are received through the cross-passages and connecting passages formed by the deflectors, which cross-passages are exemplified as rectangular in cross-section and extend back and forth throughout substantially the horizontal cross-sectional area of the heater, and having the cross-passages for the air being heated, also exemplified as rectangular in cross-section, extending back and forth crossingly between the same, and extending substantially throughout the horizontal cross-sectional area of the heater.

Single walls of metal are thus provided by this construction between the passages for the products of combustion and the passages for the air being heated, enabling substantially all of the heat in the products of combustion to be transferred to the air being heated.

The cool incoming feed-air for the furnace passes first through the upper cross-passages 21, where it is acted on by the cooler portions of the products of combustion passing through the upper cross-passages 31, and has heat transferred thereto through the walls of said passages. The air being heated is acted on progressively by hotter portions of the products of combustion as it proceeds to the wall of the fire-box, where it is acted on by the hottest portions of the products of combustion.

The products of combustion arising from the heating element pass through the cross-passages 31, the hottest portions of the products of combustion crossing through the lower ones of said cross-passages and transferring heat to the heating air at the other sides of said walls of said cross-passages, the products of combustion cooling as they pass through the upper ones of said cross-passages 31 for utilizing substantially all of the heat therein for heat transference to the heating air.

The products of combustion contain vapor which is caused to condense preferably in the heater, for instance in the form of beads 71 of condensation forming on the bottom surface of the wall 23a separating an air passage from the flue gas passage. The latent heat resulting from this condensing is transferred to the air in the air passage 21a by convection, thus adding to the heat of this air, and providing an economical factor in creating this condensation. This condensation is afterwards transferred into the current of heating air, and the cooling effect which this condensation has upon the air is counteracted by the heating effect due to the condensing, and at the same time moisture is made available for humidifying purposes.

The beads of condensation are led from the passage or flue for the products of combustion at a cooler portion or portions in said products of combustion to a hotter portion or portions of the air being heated, the air being heated at said latter portion or portions again vaporizing the condensation and receiving the condensation as a humidifying agent.

Beads 71a of condensation may also form at a portion of the passage or flue for the products of combustion more distant from the fire-box if greater heat is applied to said products of combustion, for instance, as exemplified by the beads 71a of condensation forming on the bottom surface of the wall 23b between a passage for the products of combustion and a passage for the air being heated. The latter beads have a course similar to the beads 71 for providing humidification for the heating air.

The transference of the condensation from the passage or flue for the products of combustion to a heating air passage may be obtained by providing the deflectors 65 with depressions 72, 72a, into which the beads of condensation 71, 71a, are caused to flow. These beads of condensation may flow along the walls 23a and 23b on which they are formed, or fall as drops to the bottom walls 22a and 22b of said respective flue passages, the walls being preferably slanted or formed in such manner so that the condensation will flow toward the depressions 72, 72a, respectively. A pipe 73 connects with the depression 72a for feeding the condensation therein to the depression 72. Either one or both of said collecting means for condensation may be provided.

There may be deleterious substances or chemicals passing with the water of condensation into the depressions 72, 72a. In order to counteract or nullify such deleterious substances, chemicals or condition. the condensation is preferably purified before admission into the heating air passage. A suitable purifying means for purifying the condensation is provided. This is exemplified as a body 75, contained in a container 76, into which the condensation is led, for instance, by a pipe 77, from the depression 72.

This container is preferably a glass jar through which the condition of the purifying agent of reagent and the condition of the water of condensation may be viewed. It is preferably placed on the outside of the furnace, and is shown provided with a screw-cap 78, supported by the furnace, into which the threaded neck 79 of the jar 76 is arranged to be screwed.

The pipe 77 passes from the interior of the furnace wall through an opening 81 in the furnace wall, to the outside of the furnace wall, and thence through an opening 82 in said cap, the pipe preferably passing downwardly in adjacency to the bottom of the container so as preferably to cause flow of the condensation through the purifying agent.

A pipe 85 connects with the cap and passes through an opening 86 in the wall of the furnace and into one of the heating air passages, preferably the lower heating air passage 21b, where the pipe 85 has a discharge mouth 87. The cap 78 may be supported by said pipes.

The water of condensation will normally be at a level in the pipe 77, for instance, at the level indicated at 88, above the outlet 87 of the pipe 85 in the heating air passage 21b. There is a continual flow by gravity from the pipe 77 through the container 76 and the pipe 85 and through the outlet 87. The higher level 88 of the water of condensation in the pipe 77 is also caused by the pressure of the heating air in the passage 21b. There is continuous water seal or water trap formed by said pipes and the container to prevent the passage of unpurified products of combustion into the heating air channel.

The water of condensation formed in the flue or passage of the products of combustion while the furnace is operating is provided in sufficient quantity to maintain a trap or seal in advance of the pipe 85 and to insure a continuous passage of the water of condensation into the heating air passage.

The amount of condensation formed in the flue or passage of the products of combustion is dependent on and proportional to the amount of heat being supplied to or passing through the furnace, and the amount of humidifying agent absorbed by the heating air for properly humidifying the same is also proportional to the amount of such air or the degree of temperature thereof passing through the heater, so that the supply of condensation for the air being heated is automatically regulated by the amount of heat applied in the furnace and the amount of air or the degree of temperature of the air being heated which passes through the furnace.

If the furnace is being operated for producing a comparatively low heat, for instance in warmer weather, there is less condensation formed and less humidity required in the air passage 21. When, however, the furnace is speeded up or caused to produce greater heat, there will be a greater amount of condensation formed for automatically supplying the greater amount of humidity required for the greater amount of air or the higher temperature of the air passing through the air passage 21. The proper amount of moisture is thus maintained in the heated air for respiration purposes and for producing an atmosphere in the heated room or apartment most conducive to healthful living conditions.

Exemplifying impurities which may be in the water of condensation received in the container 76 from the flue or passage for the products of combustion, and instancing the fuel as gas, such condensation may contain dilute sulphuric acid, in proportion in a range of one to four parts per ten thousand parts. Such acidulous condition is neutralized by means of pure lime-stone.

A suitable purifying agent or reagent, exemplified at 7', for neutralizing the sulphuric acid, may be instanced as barium hydroxide or lime-stone.

The container for a heating plant delivering approximately 700 cubic feet of heated air per minute may be of 2 quart size and the lime-stone therein be of a weight of approximately 3 pounds.

A charge of said lime-stone in the container will last approximately two years during continuous operation of the heater.

Other impurities may be contained in the condensation, depending on the fuel employed, which may be determined by chemical analysis, precipitation and flotation, and a purifying agent or reagent which will neutralize, nullify or arrest such impurities contained in the condensation may be employed in the container 76, the purifying agent acting as a filter, both chemical and mechanical for such impurities. As, for example, the air for combustion might contain sulphur dust and silica dust. The sulphur will be chemically neutralized by the lime-stone and the silica will settle out by gravity or be held by adhesion to the filtering agent.

Instancing the condensation formed, it may be stated that the combustion of one hundred feet of a retort coal gas forms approximately 7.92 pounds of water vapor, $H_2O$, which is invisible until condensed. This condensation takes place below 212° Fahrenheit, at atmospheric pressure, and forms in the passages or flue in the products of combustion, as hereinbefore stated. The water vapor in the heated gases results from the combustion of the hydrogen in the gas, and, if the exact amount of air is added for perfect combustion, such resultant flue gases will have a dew-point of approximately 136° Fahrenheit.

The condensing is enhanced by having cool feed-air coact with the cooler portions of the products of combustion, by feeding said heating air and the products of combustion in opposite directions at opposite sides of the separating walls between the same.

Such condensing will occur on the cool metal surfaces, even though the flue gases may be generally above the dew-point, and when it occurs, the latent heat of condensation is transferred to the cooler body, which in this case is the air. However, some re-evaporation occurs because the gases are above their dew-point, and the heat transfer in this case, following as before the basic law of thermo-dynamics, results in the cooling of the flue gases.

Having thus fully described my invention, what I claim as new, and desire to secure by Letters Patent, is:

1. A method of humidifying air being heated which comprises heating the air by flue gases, simultaneously condensing water vapor constituent of said flue gases and simultaneously transferring the condensate to the air being heated.

2. A method of humidifying air being heated which comprises heating the air by flue gases, simultaneously condensing water vapor constituent of said flue gases, purifying the condensate and simultaneously transferring the condensate to the air being heated.

3. A method of humidifying air being heated which comprises heating the air by flue gases, condensing water vapor constituent of said flue gases and transferring the condensate to the air so being heated as a continuous operation.

4. A method of humidifying air being heated which comprises heating the air by flue gases, condensing water vapor constituent of said flue gases, purifying the condensate and transferring the condensate to the air being so heated as a continuous operation.

5. A method of humidifying air being heated for respiration or air-conditioning purposes, which comprises condensing flue vapor from the products of combustion heating the air while so heating the air, purifying said condensation, and transferring the purified condensation of the flue vapor into the air while the air is being so heated by the heat of said combustion, in continuous sequence and in volume proportional to the heat of the combustion of the heating agency in heating the air.

6. A method of humidifying air being heated for respiration or air conditioning purposes, which comprises condensing flue vapor from the products of combustion heating the air while so heating the air, purifying said condensation, and transferring the purified condensation of flue vapor into the air while the air is being so heated by the heat of said combustion, in continuous sequence and in volume proportional to the heat of the combustion of the heating agency in heating the air, and neutralizing said condensation during such transfer.

7. A method of humidifying air being heated which comprises subjecting the products of combustion to the cooling action of air being heated and caused to travel in a general direction reverse to the direction of travel of the products of combustion for condensing flue vapor, and introducing the condensation into said air being heated in continuous sequence.

8. A method of humidifying air being heated which comprises subjecting the products of combustion to the cooling action of air being heated and caused to travel in a general direction reverse to the direction of travel of the products of combustion for condensing flue vapor in a cooler portion of the products of combustion, and introducing the condensation into a hotter portion of said air being heated in continuous sequence.

9. A method of humidifying air being heated which comprises subjecting the products of combustion to the cooling action of air being heated and caused to travel in a general direction reverse to the direction of travel of the products of combustion for condensing flue vapor, purifying the condensate, and introducing the condensate into said air being so heated in continuous sequence.

In testimony whereof, I have hereunto signed my name.

EVERETT S. BUCK.